Feb. 9, 1965     C. R. HORNER ET AL     3,169,188
CASE FOR PHOSPHOR GLASS DOSIMETER
Filed Aug. 18, 1952     2 Sheets-Sheet 1

INVENTORS
CHARLES R. HORNER
WILLIAM F. GRAY
BY George Sipkin
B. L. Zangarel
ATTORNEY

HARDNESS OF RADIATION

HARDNESS OF RADIATION

United States Patent Office 3,169,188
Patented Feb. 9, 1965

3,169,188
CASE FOR PHOSPHOR GLASS DOSIMETER
Charles R. Horner and William F. Gray, Alexandria, Va., assignors to the United States of America as represented by the Secretary of the Navy
Filed Aug. 18, 1952, Ser. No. 305,098
17 Claims. (Cl. 250—83)
(Granted under Title 35, U.S. Code (1952), sec. 266)

The present invention relates generally to a dosimeter for measuring received radiation, such as accompanies an atomic blast, and more particularly to a dosimeter utilizing a phosphor glass which stores up energy proportional to the amount of radiation received.

An atomic blast is accompanied by radiation which includes photon, or gamma and X-radiation, as well as alpha and beta particle radiation. All such radiation may be harmful to human beings. Exposure to an excessive quantity of alpha and beta particles will noticeably affect the outer portions of the human body and may produce a bad surface burn. The higher energy level gamma rays penetrate the body and may seriously damage internal organs without a noticeable effect on the outer part of the body. In order to warn against such damage, it is desirable to provide a radiation-detector or dosimeter that can be worn by an individual exposed to radiation. It is desirable that such a dosimeter be primarily responsive to photon radiation to apprise the wearer of exposure and damage to the internal organs even though there may be no external burns.

Although a great many radiation detectors or dosimeters are available, there is a need for one that is simply constructed, light in weight, and which can easily be carried. In the past such detectors as electroscopes, ionization chambers, proportional counters, Geiger-Mueller tubes, photographic film badges, scintillation-photomultiplier counters have been used. These devices suffer from various disadvantages. Electroscopes require very delicate adjustment, the parts are small and must be very accurately assembled, and the units are generally expensive. Ionization chambers are effective to accurately indicate the amount of radiation present, but they require delicate adjustment, they are generally relatively heavy pieces of equiment, and they are costly. Detectors such as proportional counters, Geiger-Mueller tubes, and scintillation-photomultiplier counters involve the use of somewhat complicated electronic circuits and are also expensive. Photographic film badges, although inexpensive and simple to make, are capable of only a single use, and they require the use of suitable film developing facilities.

This invention makes use of the ability of a phosphor glass to store up energy proportional to the amount of radiation falling upon the glass. When ultraviolet light is subsequently focused upon the glass, it will give off light in a quantity which will indicate the amount of radiation originally received by the glass. In the preferred embodiment a small phosphor glass is mounted within a casing in such a manner that radiation will strike either the front or back face. Fluorescence will occur upon the subsequent application of ultraviolet rays to the glass. The dosimeter casing is so designed that the fluorescent light at a side edge of the glass can readily pass out of the casing to be measured or detected in any suitable way. For example, the light may be used to actuate a photomultiplier which will amplify the light given off and convert it into a reading of current. In order to provide a more uniform sensitivity and for other reasons, the glass is shielded on at least two sides by lead shields inside the casing. These shields act to filter out the alpha and beta radiation from the radiation received, and to even out the response of the phosphor glass to photon radiation of varying degrees of hardness.

Accordingly it is an object of the present invention to provide a dosimeter which is extremely simple to manufacture, which is very inexpensive, and which can be produced economically.

A further object of the invention is to provide a dosimeter which is compact, tamper-proof, simple to use, and which can be easily worn by a person subject to radiation.

It is a further object of the present invention to provide an improved dosimeter to indicate the quantity of photon radiation to which it has been subjected.

Another object of the invention is the provision of a device to measure the total quantity of photon radiation received by the wearer of the device.

A further object of the invention is the provision of a device utilizing a phosphor glass responsive to photon radiation falling upon it.

It is a still further object of the invention to provide a dosimeter that includes a phosphor glass shielded and mounted within a suitable carrying case in such a way as to be capable of receiving and storing energy proportional to the amount of photon radiation falling upon it.

Other objects and advantages of the invention will hereinafter become more fully apparent from the following description of the accompanying drawings which illustrate a preferred embodiment, and wherein.

Figure 1:
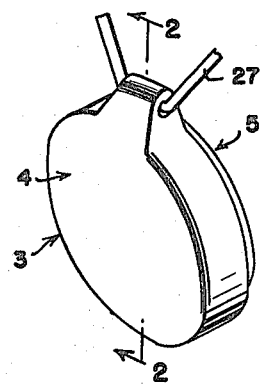
FIGURE 1 is a perspective view of the assembled device.

Referring now to the drawings wherein like reference characters designate like or corresponding parts throughout the several views, there is shown in FIGURE 1 the assembled dosimeter 3. Cap member 4 and base member 5 are screwed together by means of suitable screw threads 6 on each member. It is noted that the thread on the cap member 4 faces internally of the dosimeter, and that on the base member 5 faces externally of the dosimeter. The two members are screwed together in sealing relation with an annular gasket 7 inserted between them. The seal may thus provide a waterproof or watertight dosimeter container.

Figure 2:
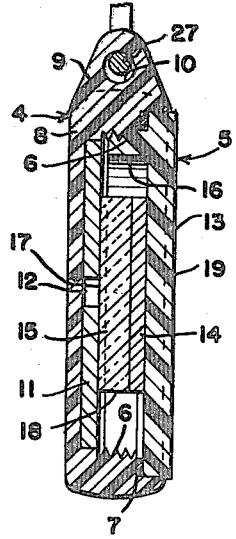
FIGURE 2 shows a side elevation, in section, of the device, taken on line 2—2 of FIGURE 1 looking in the direction of the arrows.
Figure 3:
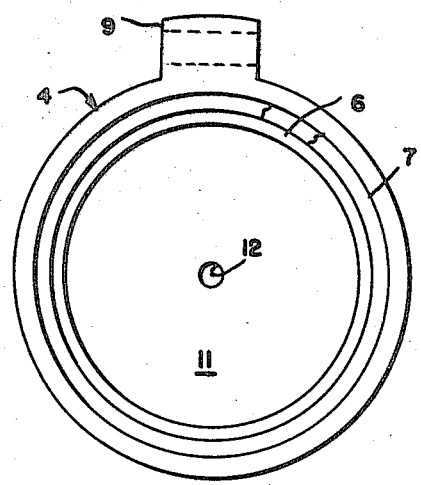
FIGURE 3 is a plan view of the internal face of the cap member of the device shown in FIGURE 1, with certain parts broken away to better illustrate the construction.

As shown in FIGURES 2 and 3, cap member 4 comprises an outer case member or cover 8 of solid material and having a lug 9 provided with a hole 10. The cap member 4 also comprises a shield piece 11 which is illustrated as being the form of a flat circular disc but may be of any form which will provide desired shielding action. It fits into an inner circular groove in the cap member 4, and has a central opening 12 drilled or otherwise formed therein.

Figure 4:
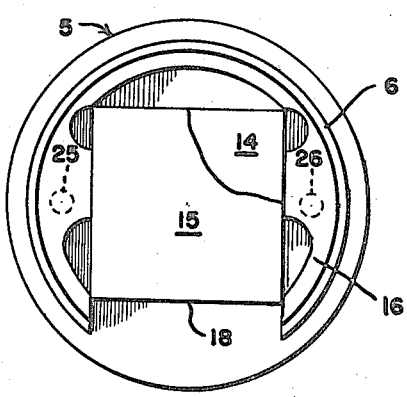
FIGURE 4 is a plan view of the internal face of the base member illustrated in FIGURE 1, with certain parts broken away to better illustrate the construction.

As shown in FIGURES 2 and 4, base member 5 comprises a case member or head 13 of solid material having a flat shield plate 14 affixed to its center portion and phosphor glass 15 shaped as a rectangular pane or parallelpiped placed on top of shield 14. Shield 14 and glass 15 are cradled within a raised, generally annular ridge or shank 16 of the case member 13, the outside of the ridge being formed with the screw threads 6. Ridge 16 may be of varying thickness and configuration, depending on the dictates of the manufacturing process used for base member 5. As shown in FIG. 4, the ridge 16 is designed with lugs and indentations to help secure phosphor glass 15 within the dosimeter; and as shown in FIG. 2, the ridge 16 terminates short of the large flat face 17 of the phosphor glass 15. It should be noted that ridge 16 is discontinuous through a number of degrees of arc adjacent a face 18 forming a side-edge of phosphor glass 15. Suitable markings on the outside face 19 of the base member 5 may be provided for indicating the location of the discontinuous or cutout portion of the ridge 16.

Holes 25 and 26 are drilled in the face 19 but do not extend completely through case 13. These holes permit a suitable wrench to be used in an obvious manner for fastening member 5 to or loosening it from member 4. By requiring a tool for opening and closing the casing, the dosimeter is made tamper-proof, since it cannot be opened by the exposed person with his bare hands.

Although other suitable materials may be utilized in the construction of the device, the following is a list of preferred materials: The casing comprising case members 8 and 13 may be made of plastic such as denoted by the trade name Tenite II. This plastic is pervious to radiation of the type involved. The phosphor glass 15 may be of the type described in U.S. Patent No. 2,524,839, dated October 10, 1950. The shielding plates 11 and 14 may be of lead; and the gasket sealing the two faces of the dosimeter together may be of polyvinyl chloride. The device may be carried around the neck of a wearer by using any suitable string or chain 27, passing through hole 10, as indicated in FIGURE 1. An indication of the size and construction of the preferred embodiment can be gained from observation of FIGURE 2, which illustrates a case member 13 having a diameter of 1.5 inches. This size indicates that the device is in the nature of an amulet.

The dosimeter is carried as an assembled unit as illustrated in FIGURE 1 with either case member 8 or 13 facing away from the wearer. Radiation passes through the walls of the members 4 and 5 and is filtered by means of the shield plates 11 or 14, depending upon the direction from which radiation is received. The lead plates have a double function. They act to stop passage of alpha and beta particles, thus making the phosphor glass 15 responsive only to photon radiation such as X- or gamma-rays. They further act to even out the energy storage, or response, of the glass to the radiation which strikes it, as explained below:

Photon radiation comprises gamma rays and X-rays, and may be either soft or hard; in general gamma radiation being the harder. If both gamma rays and X-rays penetrate the casing to the phosphor glass 15, the effect of the X-rays on the glass 15 would be greater than, and would overshadow, that of the gamma rays. That is to say that the response of an unshielded phosphor glass to X-rays of a definite quantity of energy will be greater than to gamma rays of the same quantity of energy. This is because the softer X-rays will not pass through the glass as readily as the gamma rays and consequently give up more of their energy to the phosphor glass. This is undesirable in a dosimeter of the type to which the invention relates because of the manner in which radiation affects human tissue.

In general exposure of human tissue to the lower energy level, or softer, X-rays would tend to cause a noticeable surface burn, whereas exposure to the harder gamma rays would tend to cause more serious internal injuries that might not be externally noticeable. Therefore if the phosphor glass in the dosimeter were unshielded it would be more responsive to X-rays than to gamma rays and would give a distorted indication of the radiation present. It might indicate that the individual carrying the dosimeter was more seriously burned by exposure to radiation consisting primarily of X-rays than he would be if exposed to radiation consisting primarily of gamma rays, whereas actually the reverse would probably be true. The lead shields around the phosphor glass prevent such distortion of indication as may be seen in the curves of FIGURE 5.

Figure 5:
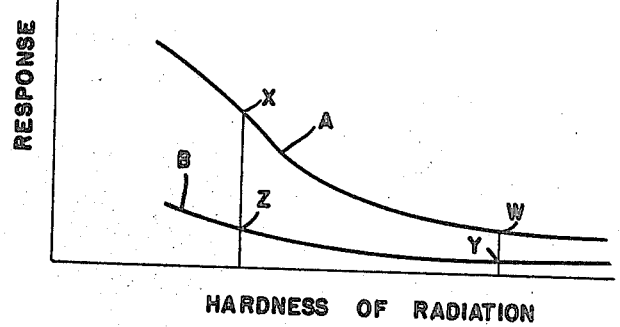
FIGURE 5 is a typical graphical representation of response, as ordinates, versus hardness of radiation received by the dosimeter as abscissae.
Figure 6:
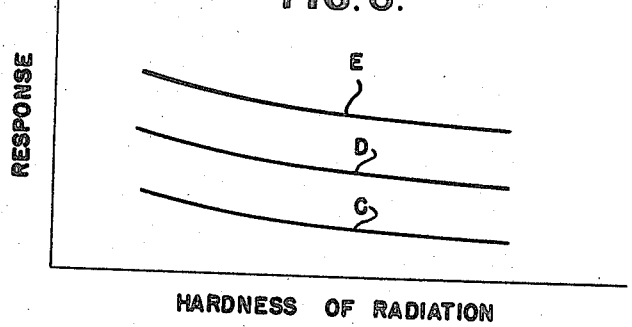
FIGURE 6 shows a family of curves showing the response versus hardness of radiation received by the dosimeter for various quantities of radiation.

Curve A of FIGURE 5 denotes unshielded response of the phosphor glass to photon radiation. As shown by curve A, an increase in hardness as at point W results in a decrease in response as compared to that shown at point X. Point W corresponds to response to gamma radiation and point X corresponds to response to X-radiation. It is seen that the harder gamma rays pass through the phosphor glass with less effect. When the lead shields are placed in front of the phosphor glass, the response is denoted by curve B. It is apparent that gamma radiation, as shown at point Y, still causes less response than X-radiation at point Z but the response has been evened out. The curve has been flattened and the proportion of the total response that is due to the gamma rays has been increased. Consequently for most practical purposes the response of the glass will be sufficiently even no matter what the hardness of the photon radiation received. As shown in FIGURE 6, when the lead shields are used, the response of the glass is denoted by the family of curves C, D, and E, depending upon the quantity of radiation received. The curves are of generally similar configuration and are arranged in ascending order of response as the quantity of radiation increases.

It should be noted that experimental usage has shown that it is desirable to cut out a center portion 12 from lead shield 11. This permits a desired amount of unfiltered photon radiation to pass into the phosphor glass 15. This sets the response level of the glass at an optimum datum level. This level may be the level denoted by any of curves C, D, or E of FIGURE 6, just as desired. The concept of cutting out a center portion of the lead shield for achieving an optimum datum level does not comprise a part of this invention.

A method of use of the dosimeter is as follows:

After the device has been exposed to radiation, the phosphor glass becomes "energized." The two halves of the dosimeter are then separated and base member 5 is exposed to ultraviolet light. The light impinges directly upon the face 17 of the phosphor glass. This causes the glass to fluoresce. Light is emitted from the face 18, and is visible since the discontinuous portion of ridge 16 allows free passage of light. Accordingly, a quantitative measure of the radiation received is always possible to observe. For quantitative measurement, face 18 may be held held adjacent to a photomultiplier so that there is amplification of the emitted light. The photomultiplier may be connected to a suitable indicating instrument. This may simply be an ammeter to indicate current produced by the photomultiplier. The reading of the indicator would be a quantitative measure of the original radiation which the phosphor glass had received.

As stated earlier, the various materials and the configuration of the elements of the combination may be varied so long as the principles disclosed are followed. It is apparent that the invention provides a unique measuring instrument that is simple, requires no adjustment and is lightweight. The materials are inexpensive, and the design lends itself to mass production. Obviously many modifications and variations of the present invention are possible in the light of the above teachings. It is therefore to be understood that such modifications may be made without departing from the spirit and scope of the invention as set forth in the appended claims.

The invention described herein may be manufactured and used by and for the Government of the United States of America for governmental purposes without the payment of any royalties thereon or therefor.

What is claimed is:

1. A dosimeter comprising a plastic cap member and a plastic base member removably joined together in watertight relationship with one another, a first lead plate mounted within said base member, a second lead plate mounted within said cap member, and an element responsive to photon radiation carried between said lead plates.

2. A dosimeter comprising a water-proof amulet of plastic material containing a photon radiation responsive element, shielding means on opposite sides of said element, said shielding means being effective to even out response of said element to a range of radiation of varying hardness, said radiation responsive element being effective to store up energy proportional to the quantity of radiation received.

3. In a radiation detection unit, the improvement comprising a radiation responsive element, shield means adjacent said element and effective to even out response of said element to radiation of varying hardness, and a plastic waterproof casing completely enclosing and supporting said element and shield means.

4. In a radiation detection unit comprising a plastic casing having a cap member and a base member removably joined together, means on each of said cap and base members co-acting with one another for forming a fluid tight seal for said casing, a radiation responsive element mounted in said base member, shield means adjacent said element, said element consisting of a piece of glass being of such a chemical composition that it will fluoresce when placed under ultraviolet light, the amount of fluorescence being a measure of the quantity of radiation previously received.

5. A dosimeter comprising a cap member and a base member removably joined together, said base member having a flat back face, a raised generally annular ridge on its front face, said ridge being discontinuous for a predetermined number of degrees of arc, a radiation responsive element mounted within said annular ridge, said element effective to store up energy proportional to the quantity of radiation received.

6. A dosimeter comprising a cap member and a base member removably joined together, said base member having a flat back face, at least two holes drilled into said back face, said holes adapted to receive an instrument whereby said base member may be removed or joined to said cap member, said base member having a raised generally annular ridge on its front face, a first lead shield fastened to said base member and within said ridge, a phosphor glass affixed to said shield, a second lead shield affixed within said cap member, and a gasket arranged to seal said cap and base members.

7. A dosimeter comprising a cap member and a base member removably joined together, said base member having an external face and an internal face, a raised generally annular ridge on its internal face, said ridge being discontinuous for a predetermined number of degrees of arc, a phosphor glass mounted within said ridge, a pair of lead shields each respectively positioned on opposite sides of said phosphor glass and affixed to the internal face portions of said cap and base members, and an opening bored in a built up portion on the outer periphery of said cap member for receiving a necklace chain, whereby said glass is effective to store up energy proportional to the quantity of radiation received, said glass giving off light which passes through said discontinuous portion of the ridge when the glass is placed under ultraviolet light.

8. An amulet for containing a lead protected radiation responsive element comprising a plastic cap member and a plastic base member removably joined together, said cap member comprising a backing member having sides integrally formed therewith for forming a cavity adapted to receive a lead shield, thread means on the internal portions of said sides, said base member comprising a plate having an internal and external face, an externally threaded flange affixed to said internal face for engaging said thread means and forming a watertight fit therewith, tool receiving means on said external face for facilitating removal of said base member from said cap member, said flange being discontinuous for a predetermined number of degrees of arc, whereby light emitted by a lead protected radiation responsive element adapted to be positioned in said base member can pass through said discontinuous portion of said flange when said element is subjected to ultraviolet light.

9. A dosimeter comprising a base, a cover, said base having a head portion and a shank portion, the periphery of said shank portion being externally threaded, said shank portion being connected to said head portion at one of its ends and being free at the other of its ends, said cover having an internally threaded opening therein, said shank portion having a cut-out space extending from its central section through a section of its periphery and through its free end, and a phosphate glass detecting element secured in said cut-out space so that at least two of its faces are exposed, said shank portion being threaded into said opening.

10. A dosimeter comprising a base, said base including a head portion and a shank portion having a threaded periphery, one end of said shank portion being connected to said head portion and the other end of said shank portion being free, said shank portion having a cut-out space extending from its central section through a section of said periphery and through a section of said other end, and a parallelepiped detecting element mounted in said cut-out space, said element having one face exposed at said section of said periphery and another face exposed at said section of said other end, said one face being perpendicular to said other face whereby exciting radiation may pass through said section of said other end and said other face and whereby fluorescent light emanating from said one face may pass through said section of said periphery.

11. A dosimeter comprising a base and a cover, said base having a head and a peripherally threaded shank, one end of said shank being connected to said head and the other end of said shank being free, said shank having a cut-out space extending from its central section through a section of its periphery and through a section of its free end, and a phosphate glass parallelepiped secured in said cut-out space so that ultraviolet radiation may pass through said section of said free end to one face of said parallelepiped and so that fluorescent light may emanate from another face of said parallelepiped through said section of said periphery, said cover having an internally threaded opening, said shank being threaded into said opening in order to form with said cover a weather-tight casing for said parallelepiped.

12. A dosimeter comprising a base, said base having a head portion and a shank portion having a threaded periphery, one end of said shank portion being connected to said head portion and the other end of said shank portion being free, said shank portion having a cut-out space extending from its central section through a section of said periphery and through a section of said other end, and a phosphate glass parallelepiped detecting element mounted in said cut-out space, said element having one face aligned with said section of said periphery and another face aligned with said section of said other end, said one face being perpendicular to said other face, whereby ultraviolet radiation may pass through said section of said other end and through said other face and so that fluorescent light emanating from said one face may pass through said section of said periphery.

13. A dosimeter comprising a cap member and a base member removably joined together, said base member having a flat back face, a raised generally annular ridge on its front face, a first lead shield fastened to said base member and within said ridge, a phosphor glass affixed to said shield, a second lead shield affixed within said cap member, and a gasket arranged to seal said cap and base members.

14. An amulet for containing a lead protected radiation responsive element comprising a plastic cap member and a plastic base member removably joined together, said cap member comprising a backing member having sides integrally formed therewith for forming a cavity adapted to receive a lead shield, thread means on the internal portions of said sides, said base member comprising a plate having an internal and external face, an externally threaded flange affixed to said internal face for engaging said thread means and forming a watertight fit therewith, said flange being discontinuous for a predetermined number of degrees of arc, whereby light emitted by a lead protected radiation responsive element adapted to be positioned in said base member can pass through said discontinuous portion of said flange when said element is subjected to ultraviolet light.

15. A dosimeter as defined in claim 11 but further characterized by radiation shielding means adjacent a pair of opposite faces of said phosphate glass parallelepiped.

16. A dosimeter as defined in claim 12 but further characterized by radiation shielding means adjacent a pair of opposite faces of said phosphate glass parallelepiped.

17. A dosimeter comprising a cap member and a base member having facing faces, and removably joined together in watertight relationship, a first radiation shielding means adjacent the face of said base member, a second radiation shielding means adjacent the face of said cap member, each of said radiation shielding means being composed of material for blocking passage of alpha and beta particles and for attenuating X-radiation, and an energy storing element responsive to photon radiation carried between said first and second shielding means.

References Cited by the Examiner
UNITED STATES PATENTS

| | | | |
|---|---|---|---|
| 2,483,991 | 10/49 | Wollan et al. | 250—83 |
| 2,496,218 | 1/50 | Kieffer | 250—65 X |
| 2,506,749 | 5/50 | Schulman et al. | 250—71 X |
| 2,524,839 | 10/50 | Schulman et al. | 250—71 X |

RALPH G. NILSON, *Primary Examiner.*